United States Patent [19]

Cole

[11] 4,359,067

[45] Nov. 16, 1982

[54] SINGLE CONTROL PROPORTIONING VALVE FOR LIQUIDS

[76] Inventor: George S. Cole, 17 Mile Dr. at Midway Pt., Pebble Beach, Calif. 93953

[21] Appl. No.: 176,118

[22] Filed: Aug. 7, 1980

[51] Int. Cl.³ ...................... F16K 19/00; F16K 31/524
[52] U.S. Cl. ............................ 137/636.4; 137/625.4; 137/607; 251/4; 251/118
[58] Field of Search ................... 137/607, 636.1, 636.4, 137/625.4; 251/4, 7, 118, 251, 120; 74/55, 56

[56] References Cited

U.S. PATENT DOCUMENTS

| | | | |
|---|---|---|---|
| 2,918,936 | 12/1959 | Dawson | 251/118 |
| 3,172,426 | 3/1965 | Cole | 137/636.4 |
| 3,519,018 | 7/1970 | Cole et al. | 137/625.4 |
| 3,646,966 | 3/1972 | Smart | 137/625.4 |
| 3,774,643 | 11/1973 | Cole et al. | 137/636.4 |

FOREIGN PATENT DOCUMENTS 2135273 1/1973 Fed. Rep. of Germany ...... 251/118

*Primary Examiner*—George L. Walton
*Attorney, Agent, or Firm*—Vogel, Dithmar, Stotland, Stratman & Levy

[57] ABSTRACT

A simplified, economical and improved single control proportioning valve for liquids which is devoid of a conventional valve body and which responds accurately to actuation of the single control despite no requirement for close tolerances in the component parts. The proportioning valve has a simple support adapted to be mounted on a sink, a pair of supply pipes for pressurized liquids associated with the support, a pair of spaced resilient tubes, corresponding ends thereof being in communication with the discharge ends of the supply pipes, a spout on the support communicating with the other ends of the resilient tubes, an elongated control cam extending between and in engagement with the resilient tubes to vary the internal cross sectional areas of the tubes, the cam being rotatable and axially movable and having a cylindrical valve-closing length and an eccentric conical valve-opening length that controls rate of flow and proportioning, and dual bearing means on the support for the cam at opposite end portions of the cam, the dual bearing means being effective to stabilize the cam against disruptive lateral and axial movements which in the absence of the dual bearing means tend to result from pressures exerted on the cam by the resilient tubes due to the pressurized liquids therein. The disclosed valve also includes structure which cooperates to mix thoroughly the proportioned fluids, and to reduce noise to an acceptably low level.

6 Claims, 5 Drawing Figures

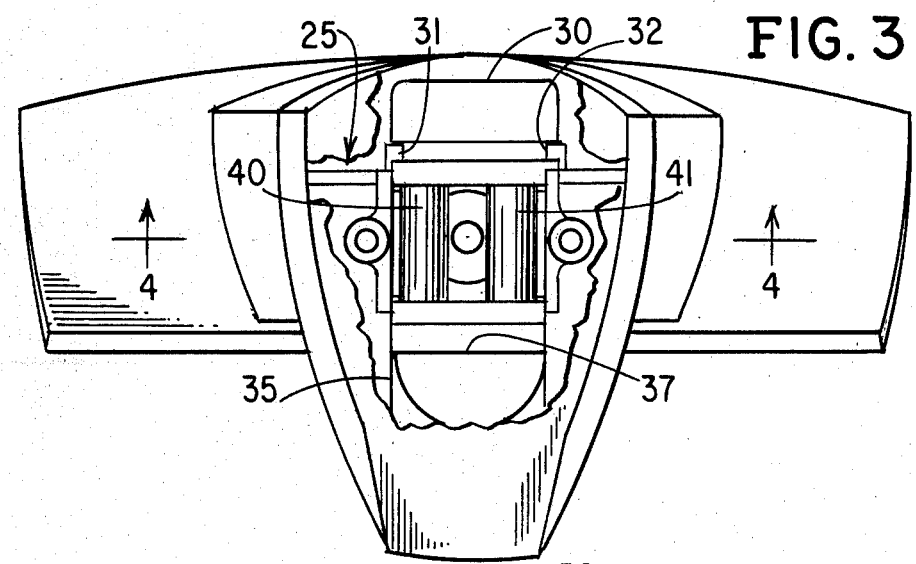
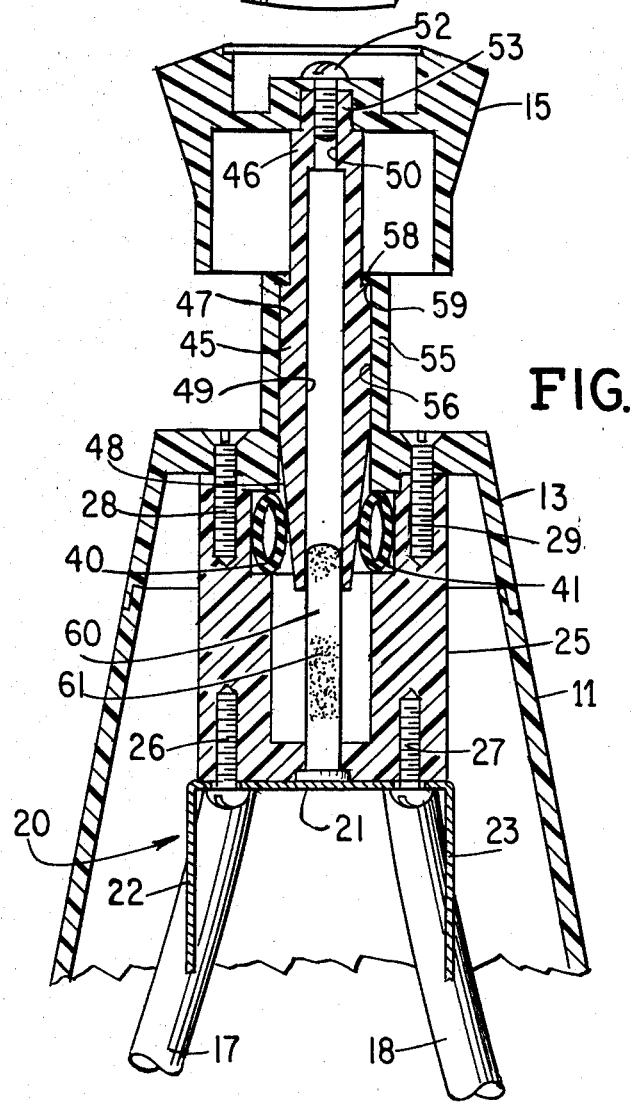

SINGLE CONTROL PROPORTIONING VALVE FOR LIQUIDS

BACKGROUND OF THE INVENTION

This invention relates to a single control proportioning valve for liquids such as hot and cold water, and more particularly to such a proportioning valve which is simplified, economical and improved, and which functions accurately without requiring close tolerances in the component parts.

One object of the invention is to provide a single control proportioning valve which is devoid of a conventional valve body, thereby making possible significant cost savings in manufacture.

Another object is to provide a proportioning valve having a simple support adapted to be mounted on a sink. The valving and proportioning functions are provided by a pair of spaced resilient tubes, and an elongated control cam extending between and in engagement with the tubes to vary the internal cross sectional areas of the tubes, the cam being rotatable and axially movable and having a cylindrical valve-closing length and an eccentric conical valve-opening length.

Another object is to provide in such a proportioning valve a dual bearing means on the support for the cam at opposite end portions of the cam, the dual bearing means being effective to stabilize the cam against disruptive lateral and axial movements which in the absence of the dual bearing means tend to result from pressures exerted on the cam by the resilient tubes due to the pressurized liquids therein.

Still another object is to provide a proportioning valve wherein the proportioned fluids are well mixed despite a comparatively small mixing chamber, thereby reducing a tendence toward objectionable laminar flow.

Another object is to provide such a proportioning valve which utilizes an aerator and yet has an acceptably low noise level.

As far as is known, the closest prior patents are U.S. Pat. No. 3,172,426 and U.S. Pat. No. 3,774,643.

The proportioning valves of the aforesaid patents, while providing functional and cost improvement over predecessor proportioning valves, utilize more or less conventional valve bodies, thereby involving manufacturing costs therefor, and are subject to disruptive lateral and axial movements of the control cam which tend to result from pressures exerted on the cam by the resilient tubes due to the pressurized liquids therein.

Further, prior proportioning valves having comparatively small mixing chambers tend toward laminar flow, and, when aerators are used therewith, tend to produce noise exceeding an acceptably low level.

SUMMARY OF THE INVENTION

The invention contemplates a bodyless single control proportioning valve for liquids such as hot and cold water, comprising a support, a pair of spaced resilient tubes, corresponding ends of the tubes in communication with the discharge ends of a pair of supply pipes for pressurized liquids which are associated with the support. A spout communicating with the other ends of the resilient tubes also is carried by the support.

An elongated control cam extends between and in engagement with the resilient tubes to vary the internal cross sectional areas of the tubes, the cam being rotatable and axially movable and having a cylindrical valve-closing length and an eccentric conical valve-opening length that controls rate of flow and proportioning.

The valve includes a dual bearing means, also carried by the support, for the elongated control cam at opposite end portions of the cam, the dual bearing means being effective to stabilize the cam against disruptive lateral and axial movements which in the absence of the dual bearing means tend to result from pressures exerted on the cam by the resilient tubes due to the pressurized liquids therein.

In more detailed aspect, the dual bearing means include a cylindrical sleeve engaging a cylindrical length of the cam at one cam end portion and cooperating male and female bearing means at the other cam end portion. One or more elements of the dual bearing means desirably is roughened or otherwise modified to increase friction, thereby further reducing the tendency toward disruptive axial movement of the cam. In preferred form, the male element of the cooperating male and female bearing means is roughened or otherwise modified, and is carried by the support, while the female element is an axial recess in the associated cam end portion.

Again, in more detailed aspect, the proportioning valve includes a supply elbow means connecting the liquid supply pipes to the resilient tubes, the elbow means being mounted on the support, thereby helping to provide a simplified and economical proportioning valve devoid of a conventional valve body, wherein the only valve components subjected to fluids in the valve are the elbow means, the resilient tubes and the spout.

Finally, the proportioning valve includes a disc restrictor and an aerator mounted in downstream order at the outlet of the spout, the disc restrictor comprising an imperforate disc having a central opening of relatively small size, the disc restrictor and the aerator cooperating to mix the fluids emerging from the resilient tubes to thus reduce the tendency toward laminar flow, and to reduce noise to an acceptably low level.

BRIEF DESCRIPTION OF THE DRAWINGS

FIG. 3 is a top view, partly broken away, of the valve shown in FIG. 1.

FIG. 4 is a longitudinal sectional view taken on lines 4—4 of FIGS. 2 and 3, the valve being shown in fully opened position with equal proportioning.

DESCRIPTION OF THE PREFERRED EMBODIMENT

Figure 1:
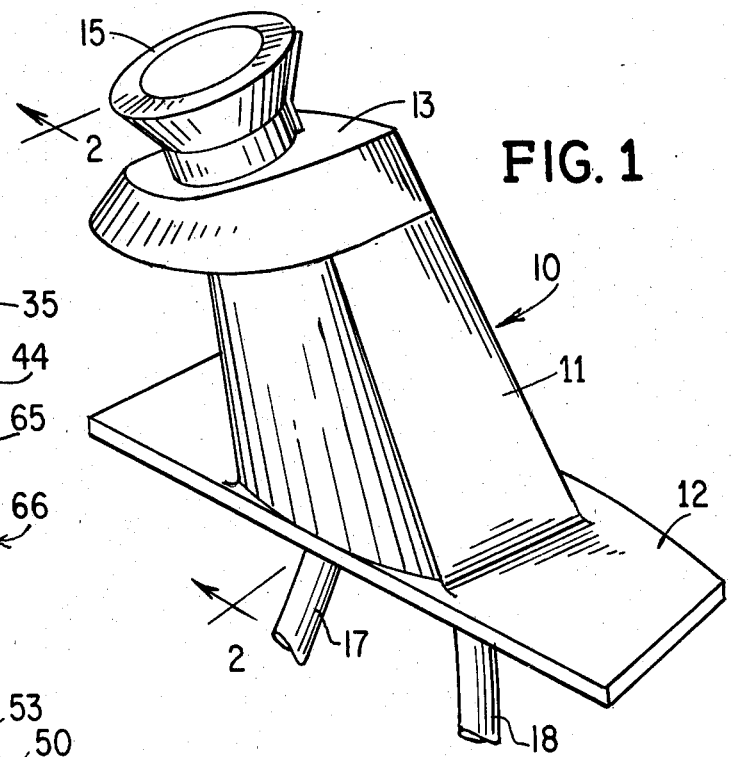
FIG. 1 is a perspective view of a faucet embodying the single control proportioning valve of the invention, the illustrated faucet being designed for lavatory use.

Referring to the drawing, FIG. 1 shows a faucet 10 utilizing the single control proportioning valve of the invention. While the illustrated faucet is designed for lavatory use, the proportioning valve of the invention is suitable for faucets designed also for kitchen, tub and shower, as well as various industrial uses.

The faucet 10 illustrated in FIG. 1 has an exterior lower shroud or housing 11 including a base 12 adapted to engage a marginal surface of a sink or other member with which the faucet is associated (not shown). An upper housing 13 is mounted atop lower housing 11 and encloses a spout structure and aerator which will be described later. Upper housing 13, as will be seen, includes an element of one bearing means of the dual bearing means which characterizes the present invention.

Figure 2:
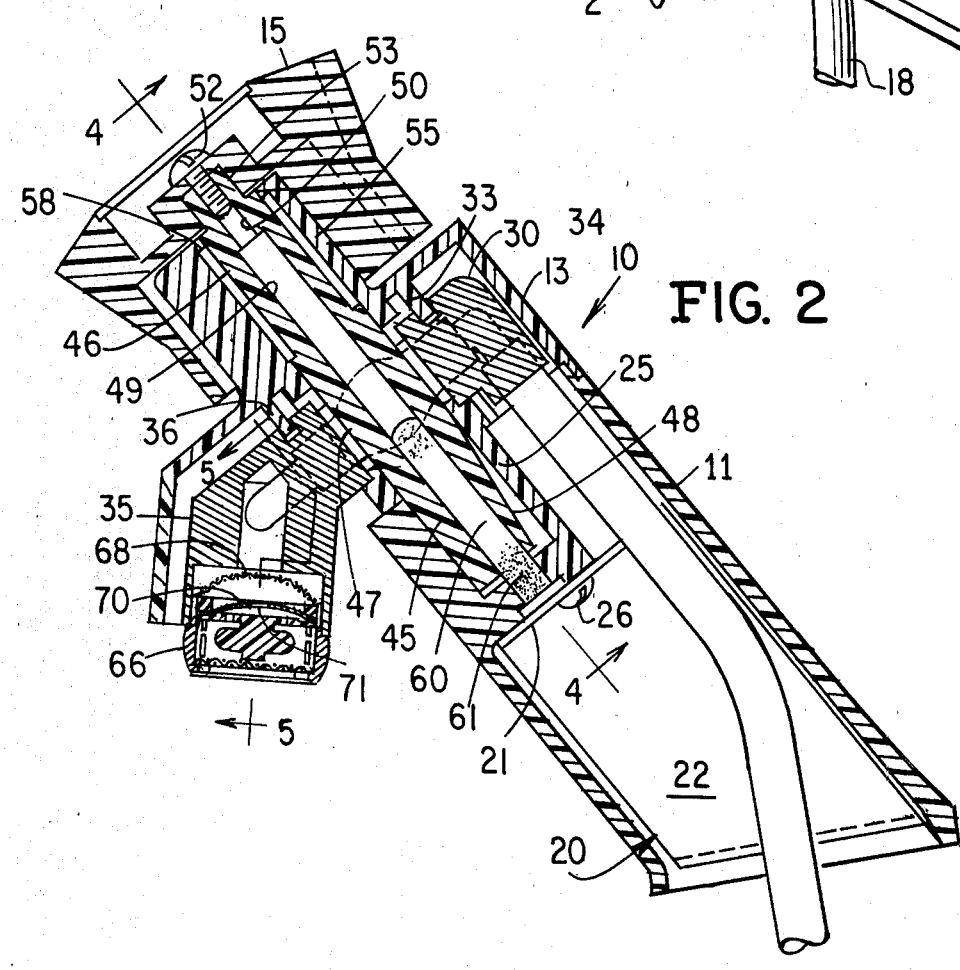
FIG. 2 is an enlarged longitudinal sectional view on line 2—2 of FIG. 1, the valve shown in fully closed position.

Knob 15 shown in FIGS. 1, 2 and 4 is the actuator for the single control member of the valve. As will be seen, knob 15 is rotatable and movable axially to control proportioning and rate of flow of two liquids through the valve, for example, hot and cold water. Supply pipes for the pressurized two liquids are designated 17 and 18 in FIGS. 1 and 4.

Referring to FIGS. 2 and 4, the illustrated faucet 10 has a composite support, one component of which is a generally U-shaped bracket 20, best shown in FIG. 4. Bracket 20 has a web 21 and generally parallel legs 22 and 23 (FIG. 4). Each leg 22 and 23 has a laterally extending foot (not shown in FIG. 4) underlying base 12 (FIG. 1) adapted to be secured to the associated sink.

As best shown in FIG. 4, lower housing 11 includes interior support structure 25 which is secured to web 21 of U-shaped bracket 20 by fasteners 26 and 27. Thus, interior structure 25 of lower housing 11 also constitutes part of the support for the functional components of the present valve. Upper housing 13 is secured to structure 25 by fasteners 28 and 29, as also best shown in FIG. 4, and thus upper housing 13 also is part of the support, as that term is used herein.

Summarizing the last two paragraphs, the composite support for the working elements of the valve comprise bracket 20, lower housing 11 and its interior support structure 25 and upper housing 13. These components, unlike conventional valve bodies and other parts, do not require close tolerances, and thus can be fabricated at low cost.

Supply pipes 17 and 18 for the pressurized liquids such as hot and cold water terminate, as shown in FIG. 2, in an elbow means 30 (also shown in FIG. 3). Elbow means 30 is suitably secured to the support, particularly to interior structure 25 of lower housing 11 and to upper housing 13. Flanges 31 and 32 (FIG. 3) of structure 25 are received in grooves at the sides of elbow means 30, while a flange 33 (FIG. 2) is received in a groove 34 (FIG. 3) in the top of elbow means 30.

Figure 5:
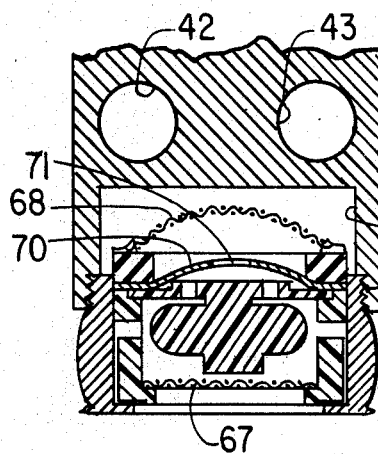
FIG. 5 is an enlarged fragmentary sectional view generally through the spout taken on irregular line 5—5 of FIG. 2.

Referring to FIGS. 2, 3 and 5, a spout generally designated 35 is more or less similarly secured to the support, particularly interior structure 25 of lower housing 11 and upper housing 13. A flange 36 (FIG. 2) of upper housing 13 enters a top groove 37 (FIG. 3) of spout 35, while suitable detachable fastening means (not shown) secure the sides of spout 35 to interior structure 25. Thus, both elbow means 30 and spout 35 are secured to the same two support components, namely, structure 25 of lower housing 11 and upper housing 13.

A pair of spaced resilient tubes 40 and 41 (FIGS. 3 and 4) extend between circular openings in elbow means 30 and circular openings in spout 35. Inner portions 42 and 43 of the circular openings in spout 35 are shown in FIG. 5. The openings 42 and 43 actually are ducts which lead to an outlet mixing chamber 44 (FIG. 5) in spout 35. The remaining parts of spout 35 will be described later.

As previously mentioned, the inlet ends of resilient tubes 40 and 41 are received within openings in elbow means 30, the openings respectively communicating with supply pipes 17 and 18. Thus, supply pipe 17 communicates through elbow means 30 with resilient tube 40, and supply pipe 18 communicates with resilient tube 41. Both resilient tubes, of course, communicate with spout 35.

An elongated control cam 45 (FIGS. 2 and 4) extends between and in engagement with resilient tubes 40 and 41 to vary the internal cross sectional areas of the tubes. Cam 45 has generally the same shape and the same function as the corresponding cams shown in the aforesaid U.S. Pat. Nos. 3,172,426 and 3,774,643.

Referring to FIGS. 2 and 4, cam 45 has a reduced diameter upper end portion 46 on which is mounted control knob 15. Below reduced upper end portion 46, cam 45 has a cylindrical valve-closing portion 47, and below that has a valve-opening and proportioning portion 48 which may be described as an eccentric cone.

Cam 45 has an axial opening 49 of uniform circular cross section extending from the lower end of the cam to a reduced opening 50 which receives a securing means 52 that secures knob 15 to cam 45. The extreme upper end 53 of cam 45 is non-circular in cross section so knob 15 and cam 45 may rotate together.

As will be understood, cam 45 is rotatable and axially movable. When cam 45 is moved axially inward to the extreme position shown in FIG. 2, cylindrical valve-closing portion 47 of the cam engages tubes 40 and 41, and closes them to the passage of liquid.

When the cam is moved axially to an outward position, as shown in FIG. 4, the eccentric conical portion 48 of the cam engages tubes 40 and 41, as best shown in FIG. 4. In the illustrated rotational position of cam 45, the proportioning setting of the valve is in a middle position, that is, the cross sectional areas of the tubes 40 and 41 are equal, and the flow rates in the tubes likewise are equal. Rotation of the cam through 90° in either direction from the middle position shown in FIG. 4, will close one of the tubes and maximize the internal cross sectional area of the other tube. Intermediate rotational positions of cam 45 provide different proportioning, as will be understood, while different axial positions provide different flow rates.

The present invention utilizes dual bearing means on the support for cam 45 at opposite end portions of the cam, the dual bearing means being effective to stabilize cam 45 against disruptive lateral and axial movements which in the absence of the dual bearing means tend to result from pressures exerted on the cam by resilient tubes 40 and 41 due to the pressurized liquids therein. This tendency increases as the parts tolerances change, due both to wear of the parts themselves and wear of the tools used in making the parts, etc. These dual bearing means now will be described.

Upper housing 13 includes a portion 55 (FIGS. 2 and 4) which has a cylindrical opening 56 (FIG. 4) therein. The diameter of cylindrical opening 56 is substantially the same as that of cylindrical portion 47 of cam 45, and thus the inner surface of cylindrical opening 56 constitutes a bearing for the cylindrical portion 47 of the cam. This bearing means is effective on the upper end portion of cam 45.

The upper end of housing portion 55 has an inwardly extending flange 58 (FIGS. 2 and 4) which is engaged by shoulder 59 (FIG. 4) on cam 45 to form an upper stop for the cam.

The lower end portion of cam 45 likewise is provided with a bearing means. As shown, this second bearing means comprises a male bearing element 60 (FIGS. 2 and 4) and a cooperating female bearing element, the latter being the surface of the axial cylindrical opening 49 in control cam 45. As will be seen in FIGS. 2 and 4, male bearing element 60 and the cooperating female bearing element always are in engagement, regardless of the axial position of cam 45. Thus, cam 45 is maintained in proper position at each end portion, thereby avoiding disruptive lateral and axial movements which in the absence of the dual bearing means tend to occur.

In certain circumstances it is desirable to roughen or otherwise modify one or more elements of the dual bearing means to increase friction, whereby the tendency toward disruptive axial movement of cam 45 further is reduced. For purposes of illustration, roughening 61 or other surface mofification is shown on the surface of male bearing element 60, although it alternatively could be provided on the surface of other bearing elements.

As shown in FIGS. 2 and 4, male bearing element 60 is carried by the support, particularly by interior structure 25 of lower housing 11. The cooperating female bearing means, of course, is the surface of cylindrical opening 49 in cam 45. It will be understood, however, that the male and female bearing means may be reversed in location, that is, cam 45 may carry a projecting cylindrical bearing element, and the support structure may have a cylindrical recess into which the element extends.

Completing the description of the proportioning valve of the invention, reference is made to FIG. 5 which shows spout 35 and comparatively small mixing chamber 44.

The discharge end of spout 35 is interiorly threaded at 65 to receive a more or less conventional aerator 66. Lower screen 67 is part of the conventional aerator, while upper screen 68 in the illustrated valve is optional.

It was noted in the course of work on the present development that when an aerator 66 is used, objectionable noise sometimes occurs. It was found possible to reduce susbstantially such noise by using a disc restrictor 70 upstream of aerator 66. As shown, restrictor 70 is an imperforate disc having a central opening 71 of relatively small size compared with the diameter of the disc. In providing the disc restrictor in the effort to reduce noise, it further was found that the restrictor also cooperates to improve mixing, i.e., reduces a tendency toward laminar flow.

From the above description, it is thought that the construction and advantages of the invention will be readily apparent to those skilled in the art. Various changes in detail may be made without departing from the spirit or losing the advantages of the invention.

Having thus described the invention, what is claimed as new and desired to secure by Letters Patent is:

1. A single control proportioning valve for liquids such as hot and cold water, comprising
a support;
a pair of spaced resilient tubes, corresponding ends of said tubes in communication with the discharge ends of a pair of pressurized liquid supply pipes connected to said support;
a spout on said support communicating with the other ends of said resilient tubes;
an elongated control cam extending between and in engagement with said resilient tubes to vary the internal cross sectional areas of said tubes, said cam rotatable and axially movable and having a cylindrical valve-closing length and an eccentric conical valve-opening length that controls rate of flow and proportioning; and
dual bearing means on said support for said cam at upper and lower end portions of said cam, said dual bearing means on said support include a cylindrical sleeve engaging a cylindrical length on said cam at the upper cam end portion and cooperating with male and female bearing elements at the lower cam end portion with a tight sliding fit throughout, during the rotatable and axial movement of said cam, whereby said dual bearing means are effective to stabilize said cam against disruptive lateral and axial movements which result from pressures exerted on said cam by said resilient tubes due to the pressurized liquids therein.

2. The proportioning valve of claim 1 wherein one of said cooperating male and female bearing elements at the other cam end portion is modified to increase friction between said male and female bearing elements, whereby the tendency toward disruptive axial movement of said cam further is reduced.

3. The proportioning valve of claim 2 wherein said male bearing element is the bearing element modified to increase friction.

4. The proportioning valve of claim 1 wherein said male bearing element is carried by said support and said female bearing element is an axial recess in said other cam end portion.

5. The proportioning valve of claim 1 with the addition of supply elbow means connecting the liquid supply pipes to said resilient tubes, said supply elbow means mounted on said support, thereby providing a simplified and economical proportioning valve devoid of a conventional valve body, wherein the only valve parts subjected to fluid in the valve are said supply elbow means, said resilient tubes and said spout.

6. The proportioning valve of claim 1, with the addition of a disc restrictor and an aerator mounted in downstream order at the outlet of said spout, said disc restrictor comprising an imperforate disc having a central opening of relatively small size, said disc restrictor and said aerator cooperating to mix the fluids emerging from said resilient tubes to avoid a tendency toward laminar flow, and to reduce noise to an acceptably low level.

* * * * *